US010066677B2

(12) United States Patent
Herkommer et al.

(10) Patent No.: US 10,066,677 B2
(45) Date of Patent: Sep. 4, 2018

(54) CLUTCH DEVICE WITH FULLY INTEGRATED HYDRAULICS

(71) Applicant: Schaeffler Technologies AG & Co. KG, Herzogenaurach (DE)

(72) Inventors: Dominik Herkommer, Schriesheim (DE); Markus Baehr, Buhl (DE); Marco Grethel, Buhlertal (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 136 days.

(21) Appl. No.: 15/102,352

(22) PCT Filed: Nov. 26, 2014

(86) PCT No.: PCT/DE2014/200657
§ 371 (c)(1),
(2) Date: Jun. 7, 2016

(87) PCT Pub. No.: WO2015/090310
PCT Pub. Date: Jun. 25, 2015

(65) Prior Publication Data
US 2017/0002874 A1 Jan. 5, 2017

(30) Foreign Application Priority Data

Dec. 16, 2013 (DE) .................. 10 2013 226 096

(51) Int. Cl.
*F16D 25/06* (2006.01)
*F16D 25/0638* (2006.01)
(Continued)

(52) U.S. Cl.
CPC .......... *F16D 25/0638* (2013.01); *F04B 1/146* (2013.01); *F04B 1/295* (2013.01);
(Continued)

(58) Field of Classification Search
CPC .......... F04B 1/146; F04B 1/295; F04B 17/03; F16D 13/52; F16D 25/0638; F16D 27/115
See application file for complete search history.

(56) References Cited

U.S. PATENT DOCUMENTS 3,166,165 A 1/1965 Anderson et al.
6,112,874 A * 9/2000 Kopp .................. F16D 25/02
192/35
(Continued)

FOREIGN PATENT DOCUMENTS

DE 1530771 5/1969
DE 3701912 8/1988
(Continued)

*Primary Examiner* — Stacey A Fluhart
(74) *Attorney, Agent, or Firm* — Volpe and Koenig, P.C.

(57) ABSTRACT

The invention relates to a clutch device for a drivetrain of a motor vehicle, including a pressure plate which is preferably displaceable in the axial direction of the clutch device, wherein the pressure plate, in a coupled position of the clutch device, presses a clutch disk against a counterpressure plate that can be connected to a crankshaft of an internal combustion engine, and including an actuating device which has a displaceable actuating piston. The displacement position of the actuating piston defines a position of the pressure plate and the actuating piston can be driven by a drive unit of the actuating device in order to displace the pressure plate between the coupled position and an uncoupled position. The drive unit has at least one pump, and the at least one pump is accommodated in a pump seat housing and the pump seat housing is connected to the counterpressure plate in such a way as to rotate therewith.

10 Claims, 9 Drawing Sheets

(51) Int. Cl.
  *F16D 21/06* (2006.01)
  *F16D 25/02* (2006.01)
  *F16D 25/0635* (2006.01)
  *F04B 17/05* (2006.01)
  *F04B 53/16* (2006.01)
  *F16D 48/06* (2006.01)
  *F04B 1/14* (2006.01)
  *F04B 1/29* (2006.01)
  *F04B 17/03* (2006.01)
  *F16D 13/52* (2006.01)
  *F16D 25/12* (2006.01)
  *F16D 27/115* (2006.01)
  *F16D 48/02* (2006.01)

(52) U.S. Cl.
  CPC .............. *F04B 17/03* (2013.01); *F04B 17/05* (2013.01); *F04B 53/16* (2013.01); *F16D 13/52* (2013.01); *F16D 21/06* (2013.01); *F16D 25/02* (2013.01); *F16D 25/0635* (2013.01); *F16D 25/12* (2013.01); *F16D 27/115* (2013.01); *F16D 48/06* (2013.01); *F16D 2021/0661* (2013.01); *F16D 2021/0669* (2013.01); *F16D 2048/0242* (2013.01); *F16D 2500/1022* (2013.01); *F16D 2500/1024* (2013.01); *F16D 2500/1026* (2013.01); *F16D 2500/1045* (2013.01); *F16D 2500/10412* (2013.01); *F16D 2500/3024* (2013.01); *F16D 2500/70406* (2013.01)

(56) References Cited

U.S. PATENT DOCUMENTS 6,607,062 B1 *  8/2003  Heatwole ............ F16D 25/0638
                                                 192/85.02
2007/0034475 A1 *  2/2007  Capito ............... B60K 23/0808
                                                 192/85.63

FOREIGN PATENT DOCUMENTS

DE      102005014633    11/2005
EP           1338814     8/2003

* cited by examiner

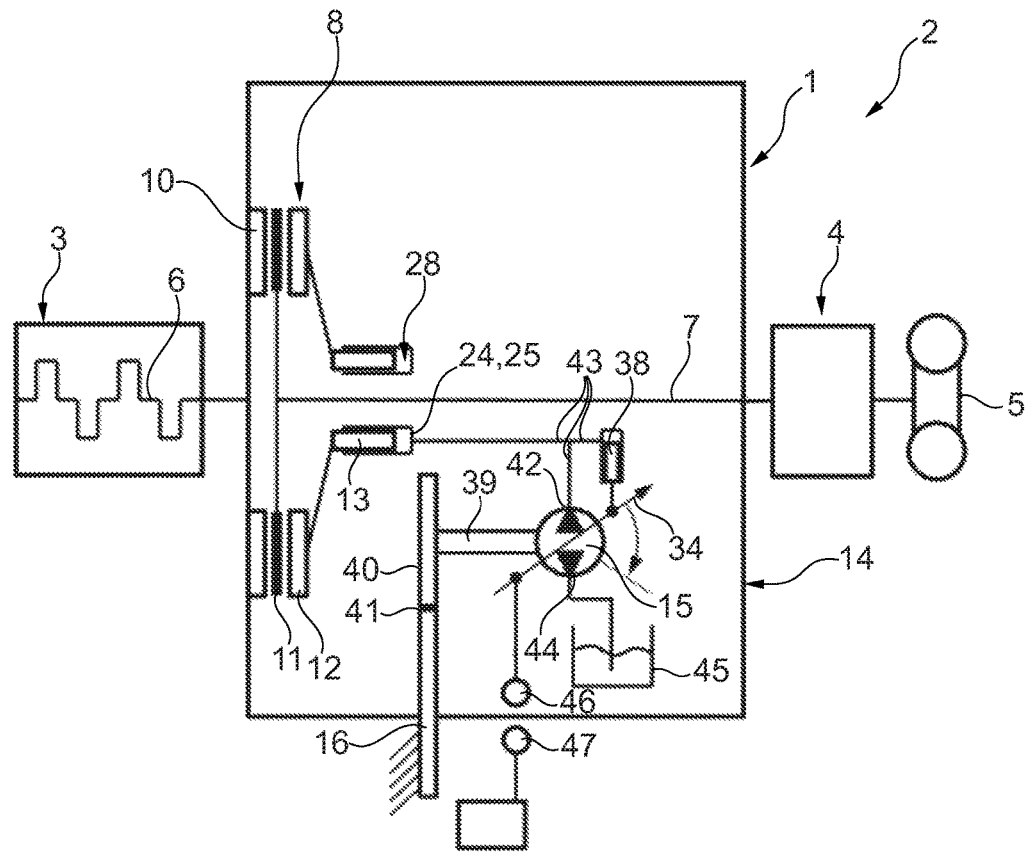
Fig. 10
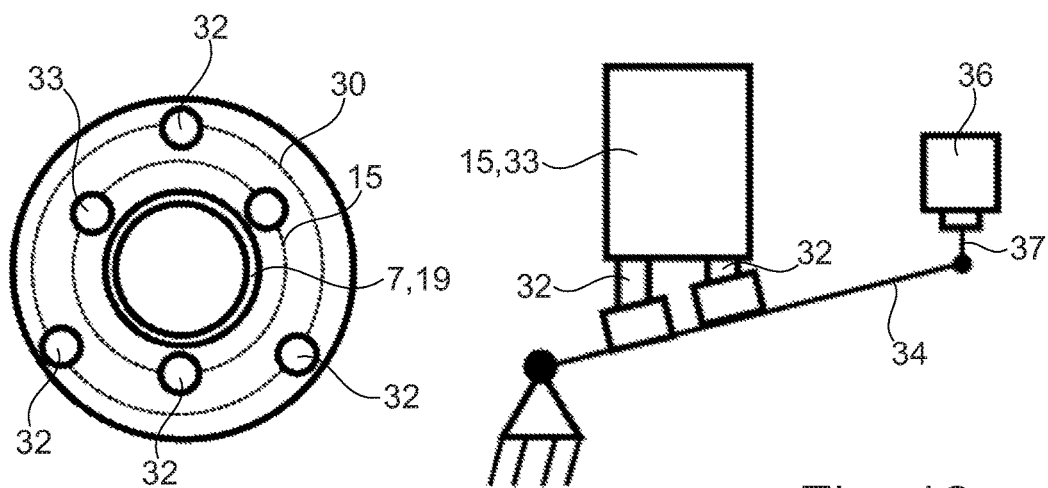
Fig. 11
Fig. 12

CLUTCH DEVICE WITH FULLY INTEGRATED HYDRAULICS

BACKGROUND

The invention relates to a clutch device (also called a modular system comprising a clutch (friction clutch/friction coupling) and clutch actuator) for a drivetrain of a motor vehicle, for example a passenger vehicle, truck, bus, or an agricultural utility vehicle, comprising a pressure plate displaceable in the axial direction of the clutch device, with the pressure plate, in a coupled position of the clutch device, pressing a clutch disk against a counterpressure plate that can be connected to a crankshaft of an internal combustion engine, and comprising an actuating device having a displaceable actuating piston, with the displacement position of the actuating piston determining the position of the pressure plate and allowing that the actuating piston to be driven by a drive unit of the actuating device between a coupled position and a decoupled position in order to displace the pressure plate.

Respective clutch devices/clutch systems are known from prior art. For example, DE 10 2005 014 633 A1 discloses a clutch and a clutch actuator as well as a method for actuating at least one clutch in a drivetrain of a motor vehicle. The clutch actuator comprises an electromotive actuating drive and a disengagement arrangement, by which a rotary motion of the actuator drive can be converted into a translational disengagement motion of a releasing device for moving the clutch, with the releasing device (disengaging arrangement) comprising a belt drive having an outer part and an inner part, and the actuator drive being formed for the releasing device of an electric motor, with the outer part of the belt drive being coupled to the crankshaft of the internal combustion engine and the inner part of the belt drive to the rotor of the electric motor.

However, clutch systems of prior art are preferably based on an electromotive actuation, with the actuating energy required for moving/adjusting the actuating piston being generated in an electromotive fashion. Additionally, the clutch systems of prior art comprises the actuator assembled from several individual components, which are only completely combined by the initial manufacturer (OEM/Original Equipment Manufacturer).

Furthermore, electronic clutches are also known, with small electric motors being positioned in the clutch/clutch device, which actuate the clutch via ramps and the booster function connected thereto. For this electromotive generation of the actuating energy however, initially relatively costly motors and their control electronics are required. Furthermore, the energy for these motors is initially taken via the alternator from the drivetrain, saved in the battery, and then tapped from there. The energy required for actuating the clutch is here initially converted expensively into electric energy via the generators or external pumps in the drivetrain. Here, major loss occurs and all components of this chain must be sized appropriately large. Additionally, it may occur that the motors are embodied too weak, due to the limited space available. Although the motors may fit inside the clutch, however in this dimension they are too weak for actuating. Accordingly, in this context commonly a booster function with ramps is used in order to generate the actuating force. However this may lead perhaps to grabbing problems and the risk develops that the clutch jams when the friction values become excessive. Additionally, these so-called booster clutches, which tap energy from the drive train, also show problems with cyclic nonconformity. Under certain circumstances, this leads to instability of the clutch torque. Furthermore these clutch systems have the disadvantage that they are frequently only assembled at the customer (OEM), resulting in potential errors during the assembly/the complete assembly being relatively high. Even if all components were previously tested, problems may still arise which can occur only during the assembly with the other OEM-parts.

SUMMARY

The objective of the present invention is therefore to correct the disadvantages known from prior art and to provide a clutch device which on the one hand reduces the risk of assembly errors and on the other hand ensures optimal energy utilization.

This is attained according to the invention in that the drive unit comprises at least one pump, with said at least one pump being received in a pump seat housing and the pump seat housing being connected in a torque-proof fashion to the counterpressure plate.

This way, a drive unit is provided, allowing the actuating energy for actuating the clutch to be obtained directly from the drivetrain/the internal combustion engine without any interposed conversion into other forms of energy, for example electric energy. The energy conversion required in electric systems and the conversion loss connected thereto is avoided, here. This way, the effectiveness of the clutch actuation is considerably increased. The energy for actuating the clutch is tapped via the pump as directly as possible at the drivetrain itself and fed to the actuating piston of the slave cylinder in the clutch. Due to the fact that the pump is additionally included in the actuating device, a particularly compact and comprehensive clutch device including the actuating device can be assembled. This way any later assembly is considerably facilitated.

In the following additional advantageous embodiments are claimed in the dependent claims and explained in greater detail.

According to another embodiment it is advantageous for at least a pump to be embodied and arranged such that it can be driven by a relative motion in reference to a housing component, which is connected fixed in the housing in a first operating state, for example when the internal combustion engine is turned on. This way a particularly direct drive of the pump is possible.

In this context it is also advantageous when the housing component can be driven via another, second drive unit in a second operating state, for example when the internal combustion engine is shut off. This way, a clutch operation can also be easily implemented in a hybrid drive. In this case, the second drive unit is embodied as an electric motor (E-motor).

Furthermore, it is advantageous when the pump seat housing is arranged coaxially in reference to a transmission input shaft of a transmission, in the operating state of the clutch device connected in a torque-proof fashion to the clutch disk. This way a nested arrangement of the pump seat housing including the pumps is possible about the transmission input shaft. The pump seat housing is also connected in a torque-proof fashion to a clutch body at the drive side/motor side. This way on the one hand a particularly compact arrangement of the pump/the actuating device is possible, on the other hand the actuating device can be fastened/integrated directly in the clutch housing of the clutch.

Furthermore it is advantageous when the pump seat housing is arranged in the axial direction next to a clutch housing encasing the pressure plate and the clutch disk and connected torque-proof to the counterpressure plate, with the clutch housing preferably connecting the counterpressure plate to the pump seat housing in a torque-proof fashion. This way the assembly is further facilitated because the pump seat housing can be connected easily to the clutch housing.

It is further advantageous when the pump has two fluid connections, with a first fluid connection being connected to a slave cylinder receiving the actuating piston, and a second fluid connection being connected to a fluid reservoir (with the clutch/clutch housing rotating in the operating state). Depending on the clutch position to be reached (engaged or disengaged position) this way additional fluid pressure can be pumped into the slave cylinder or pumped out of it.

It is also beneficial when at least one pump is embodied as an adjustable pump, allowing its direction of flow, independent from the drive direction of the pump (the drive direction of the pump is equivalent to the direction of rotation in which the drum of the pump is driven), to be inverted, and with its flow rate being adjustable through zero (i.e. adjustable via a neutral setting of the pump, in which the flow rate/stroke of the pump is zero regardless of the rotation of the pump), allowing a fluid pressure influencing the displacement position of the actuating piston to be controlled depending on the pump setting (predetermining the direction of conveyance). (Here the fluid pressure can be controlled (electrically) via the target signal and is adjusted in the pump via an equilibrium between the actuator force and the sensor piston force). Here, at least three pump settings are given. In addition to the above-mentioned neutral setting, there is at least one first pump setting in which the stroke is adjusted such that a pressurized fluid is conveyed from the first fluid connection to the second fluid connection. In at least another, second pump setting the conveyer stroke is adjusted such that the pressurized fluid is then conveyed from the second fluid connection to the first fluid connection. For example, at least one pump can be embodied as an adjustable axial piston pump which has several pump pistons positioned displaceable in a drum, with the pump piston being arranged in the radial direction outside a central pump drive shaft. The piston stroke of the axial piston pump can be set by a swashplate, adjustable in its tilt. This way the pump can be embodied in a particularly space-saving fashion.

When the direction of conveyance and the conveyed volume of the pump setting influencing at least one pump can be changed by an actuator, the pump setting can be implemented in a particularly simple fashion.

The actuator device, adjustment of the volume of the pump conveyed, is here beneficially embodied such that the actuator applies a predetermined force/moment upon the adjustment and a pressure sensor, which may be embodied as a sensor piston, applies a force/moment upon the adjustment. By a suitable arrangement of the actuator and the pressure sensor/sensor piston this way here hydro-mechanical pressure control results.

In this context it is advantageous when at least one pump has a pressure control, which resets a pump into a neutral position when a certain fluid pressure is reached, predetermined by a control signal in the actuator and applied at the actuating piston and a sensor piston, in which the neutral setting of the fluid pressure is kept constant (since the volume flow is zero, independent from the pump speed).

The supply of energy and the signal for the actuator (the target pressure signal) are here transmitted to the rotary clutch system preferably in a touchless fashion (e.g., inductively).

If furthermore the actuator can be operated inductively, for example via a coil system, the piston stroke of at least one pump can be adjusted individually and additionally space can be saved.

If the pump drive shaft of the pump is arranged/aligned essentially parallel in reference to the rotary axis of the clutch, the actuating device and its pump are arranged in an even more space-saving fashion.

If the pump drive shaft is further connected to a sprocket in a torque-proof fashion, which sprocket engages a countergear fixed at the transmission housing, here a cost-effective transmission unit can be implemented by which during operation, i.e. when the internal combustion engine is active and the clutch housing rotates, the pump can be permanently driven. This way a particularly stable connection can be implemented.

If the pump pistons are further connected to a swashplate, adjusting the stroke of the pump during operation, the pump can be used in a versatile fashion. On the one hand it can be switched for a quick coupling, for example in the pressure-impinged condition, as well as for rapid decoupling, for example during pressure reduction, into a disengaged position. This way the cycle times are further improved/shortened.

It is also advantageous if the clutch device is embodied as a double clutch, with one each of two partial clutches of the double clutch comprising an actuating device. This way, a double clutch can also be embodied in a particularly space-saving fashion.

In other words, this way a clutch device embodied as a single or a double clutch can be implemented, in which the actuating energy is tapped from the drivetrain. Here, an actuator is provided for a clutch, in which the energy is essentially tapped from the drivetrain itself. For this purpose, a pump is provided, which is actuated by a relative motion of the pump in reference to the component fixed at the housing/transmission housing, and this way pressure is generated in a hydraulic circuit/fluid circuit. The relative motion can be achieved by providing the pump in a housing also rotating, and by gears engaging a sprocket fixed at the housing. This way, a relative rotary motion can be generated in the pump. In one preferred embodiment this represents an axial piston pump (however other pumps are also possible). By the relative motion the pump is rotated in reference to an inclined plane (swashplate) and this way it can generate a pressure in the hydraulic circuit as a function of the inclined position of the plane/swashplate. Furthermore, an actuator is provided which acts upon the plane and influences its inclined position. For this purpose, the actuator can be wirelessly supplied with energy. The control electronic for this actuator is here fixed at the housing and via the controls of the actuator it determines the relative position of the inclined plane. This way, in the hydraulic circuit both a pressure as well as a vacuum can be generated. At the end of the inclined plane opposite the actuator advantageously also a sensing piston/sensor piston is arranged, which is connected to the high-pressure output of the pump. Depending on the position of the actuator the position of the inclined plane is predetermined, according to which a pressure is then adjusted in the hydraulic circuit by the sensing piston, which is yielded by the pump. This represents a pressure control. The actuator and the sensor piston each act with a force upon the swashplate. The position of the swashplate results from the force difference between the actuator and the sensor piston. If the forces are equivalent, the swashplate is in balance and the volume flow is 0. When the actuator force is altered, the swashplate yields to the greater force, so that the pump conveys until the balance of force has been reestablished. The pressure is therefore predetermined by the actuator, causing the actuator to act upon the plane and being adjusted by the sensor piston/sensing piston. In case of leakage, then the fluid is resupplied from the reservoir. The actuator can be used both for a single clutch as well as a double clutch. For this purpose, the clutch comprises a pump, a slave cylinder, and a reservoir/fluid storage space. In a hybrid drive the pump is coupled to the electric machine. In a further development the reservoir comprises a volume compensation device.

BRIEF DESCRIPTION OF THE DRAWINGS

In the following the invention is explained in greater detail based on figures, with several embodiments being shown.

Shown are.

DETAILED DESCRIPTION OF THE PREFERRED EMBODIMENTS

Figure 1:
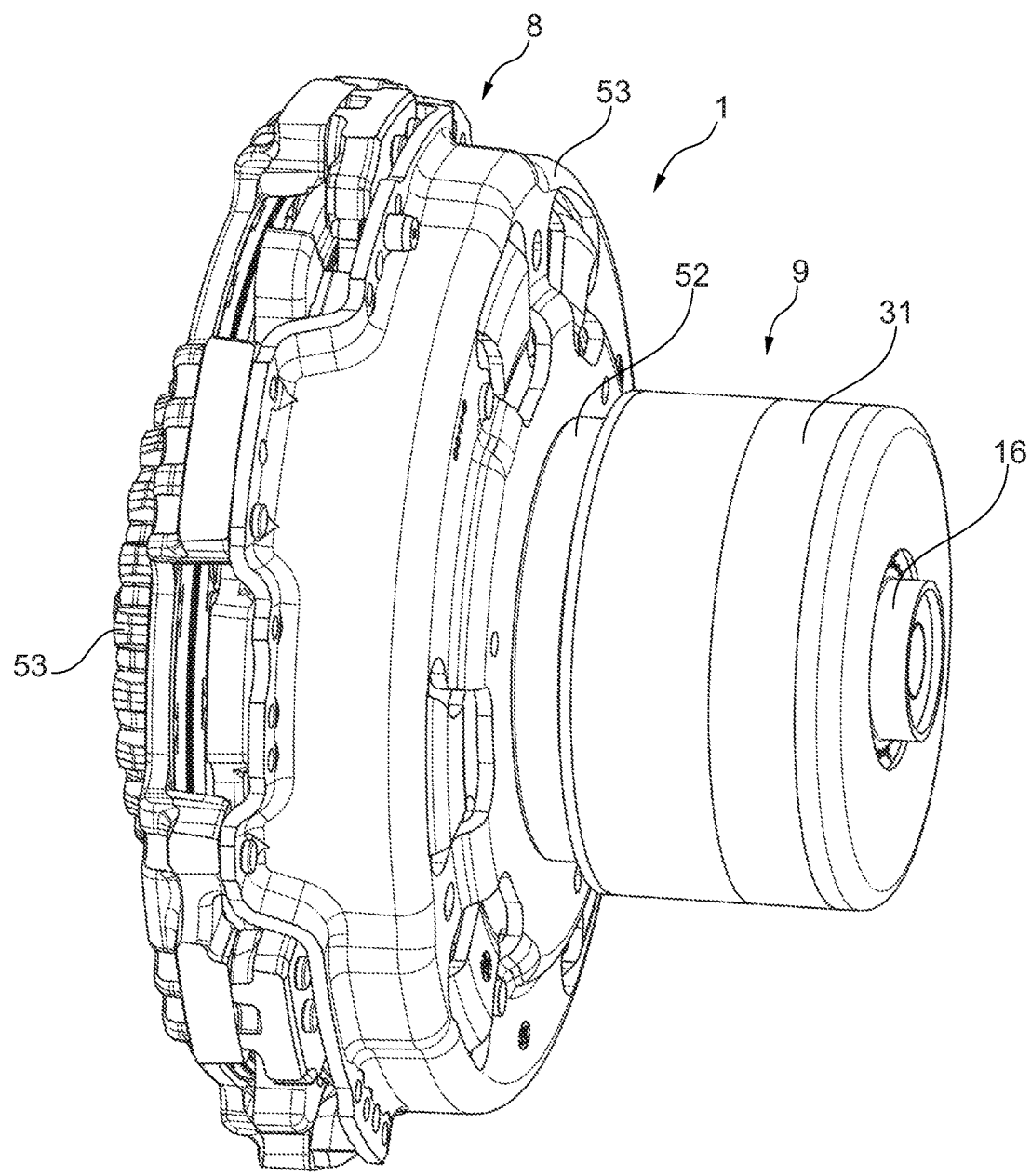
FIG. 1 an isometric illustration of a clutch device according to the invention according to a first embodiment, with the clutch device being shown from the outside and particularly the arrangement of the pump seat housing of the actuator device being discernible at the clutch housing, FIG. 2 an isometric longitudinal cross-section of the clutch device already illustrated in FIG. 1, with the clutch device being embodied as a double clutch and the inner structure of the clutch device being clearly discernible, and with the actuating device having two pumps arranged distributed about the circumference, FIG. 3 a cross-sectional detail of the clutch device already shown in FIGS. 1 and 2, with the cross-section also representing a longitudinal section, with particularly the pumps not being sectional, and with the pump drive shafts, swashplates, and gears being shown in their three-dimensional extension, FIG. 4 an isometric longitudinal cross-section of a clutch device according to the invention based on another, second embodiment, with the sprockets of the pump, unlike in FIGS. 1 to 3, not engaging an external gear of a part fixed to the housing, but engaging an internal gear of an annular gear fixed at the housing, FIG. 5 an isometric illustration of a pump housing divided by a longitudinal cross-section as used in the clutch device according to one of the embodiments shown in FIGS. 1 to 4, with particularly in the area around the swashplate being shown around one of the pumps, and the arrangement of the fluid reservoirs being discernible, FIG. 6 an isometric illustration of a pump including the swashplate, actuator, as well as sensor pistons, with particularly the arrangement between the actuator and the sensor piston as well as the pump piston of the pump being illustrated, FIG. 7 an isometric illustration of the undivided pump seat housing (similar to FIG. 5), supporting the two pumps, with particularly the arrangement of the two pumps being shown in reference to each other about the circumference of the pump seat housing, FIG. 8 an isometric illustration of another embodiment of an actuator device of a clutch device according to the invention, with particularly the actuator as well as the swashplate of the pump being embodied slightly differently than the one in FIGS. 1 to 7, FIG. 9 a schematic diagram of a clutch device according to the invention, with particularly the functionality of one of the pumps of the actuating device as well as the installation position of the clutch device in the drivetrain of a motor vehicle being discernible, FIG. 10 a schematic diagram according to FIG. 9, with here another embodiment of the actuator being shown, with the swashplate being directly adjustable by an inductive field, FIG. 11 a schematic cross-sectional illustration of a sectioned actuating device of a clutch device according to the invention based on another embodiment, with in this case the pumps being embodied such that they are arranged stacked concentrically in reference to each other about the transmission input shaft, FIG. 12 a schematic illustration of an actuator device of the clutch device according to the invention based on another embodiment, with the tipping axis of the swashplate being arranged outside the center of the pump/eccentric in reference to the pump, and allowing to waive an additional sensor piston, because the piston forces of the pump act directly upon the swashplate, and FIG. 13 a longitudinal cross-sectional illustration of another embodiment of a clutch device according to the invention, with here the double clutch being embodied as a multi-disk double clutch.

The figures are merely of a schematic nature and only serve for understanding the invention. Identical elements are marked with the same reference characters.

FIGS. 1 to 13 show generally different embodiments of the clutch device 1 according to the invention. These clutch devices 1 shown are always intended for the use in a drivetrain 2 (particularly clearly discernible in FIG. 9) of a motor vehicle, such as a passenger car, truck, bus, or agricultural utility vehicle. Here the clutch device 1 serves commonly as a detachable connection element for the optional transmission of torque from a crankshaft 6 of an internal combustion engine 3, such as a gasoline or a diesel engine, to a transmission 4, which transmission then is further connected to one or more wheels 5 of the motor vehicle. Furthermore, the clutch device 1 has essentially at least two partial sections. On the one end, the clutch device 1 has a clutch section (first partial section), in which the parts transmitting the torque are located, which clutch portion hereinafter being called clutch 8. On the other hand, the clutch device 1 comprises an actuator section, in which the position of the elements controlling the clutch are included, which actuating section hereinafter being called actuating device 9.

The clutch 8 embodied as a friction clutch is essentially designed and operating as the clutch known from DE 10 2005 014 633 A1, which shall be considered incorporated herein. The friction clutch/clutch 8 comprises a pressure plate 12, displaceable in the axial direction (along the rotary axis of the clutch) of the clutch device 1, with the pressure plate 12 pre-stressing a clutch disk 11 against a counterpressure plate 10 in a coupled state of the clutch device 1 such that the clutch disk 11 is connected in a torque-proof fashion to the counterpressure plate 10. In the uncoupled state however the pressure plate 12 is not pre-stressed against the clutch disk 11, so that the torque is not transmitted by the counterpressure plate 10 to the clutch disk 11. As clearly discernible in FIGS. 1 to 4, the counterpressure plate 10 is embodied as a housing lid 10. The clutch disk 11 as well as the pressure plate 12, displaceable in the axial direction of the clutch device 1, is displaceable in reference to the housing lid/counterpressure plate 10.

The actuating device 9 further included in the clutch device 1 has an actuating piston 13, also displaceable in the axial direction, with the displaced position of the actuating piston 13 determining the position of the pressure plate 12 and allowing the actuating piston 13, in order to displace the pressure plate 12 between the coupled position and the uncoupled position, being driven by a drive unit of the actuating device 9. Here, the drive unit 14 comprises a pump 15, with the pump 15 being embodied and arranged such that it allows an operating state of the clutch device 1 to be driven by a relative motion in reference to a housing part 16, allowing the position of the actuating position 13 to be modified as a function of a fluid pressure controlled by the pump 15. The housing part 16 is in a first operating state, in which the internal combustion engine 3 is switched on and the crankshaft 6 rotates, connected fixed to the housing, for example fixed to the housing of the transmission (directly to the housing of the transmission itself). In a second operating state, in which the internal combustion engine 3 is switched off and the crankshaft 6 is not rotating/is stationary, the housing part 16 can be/is driven by another, second drive unit. This second drive unit in turn is embodied as an electric motor, for example.

Figure 2:
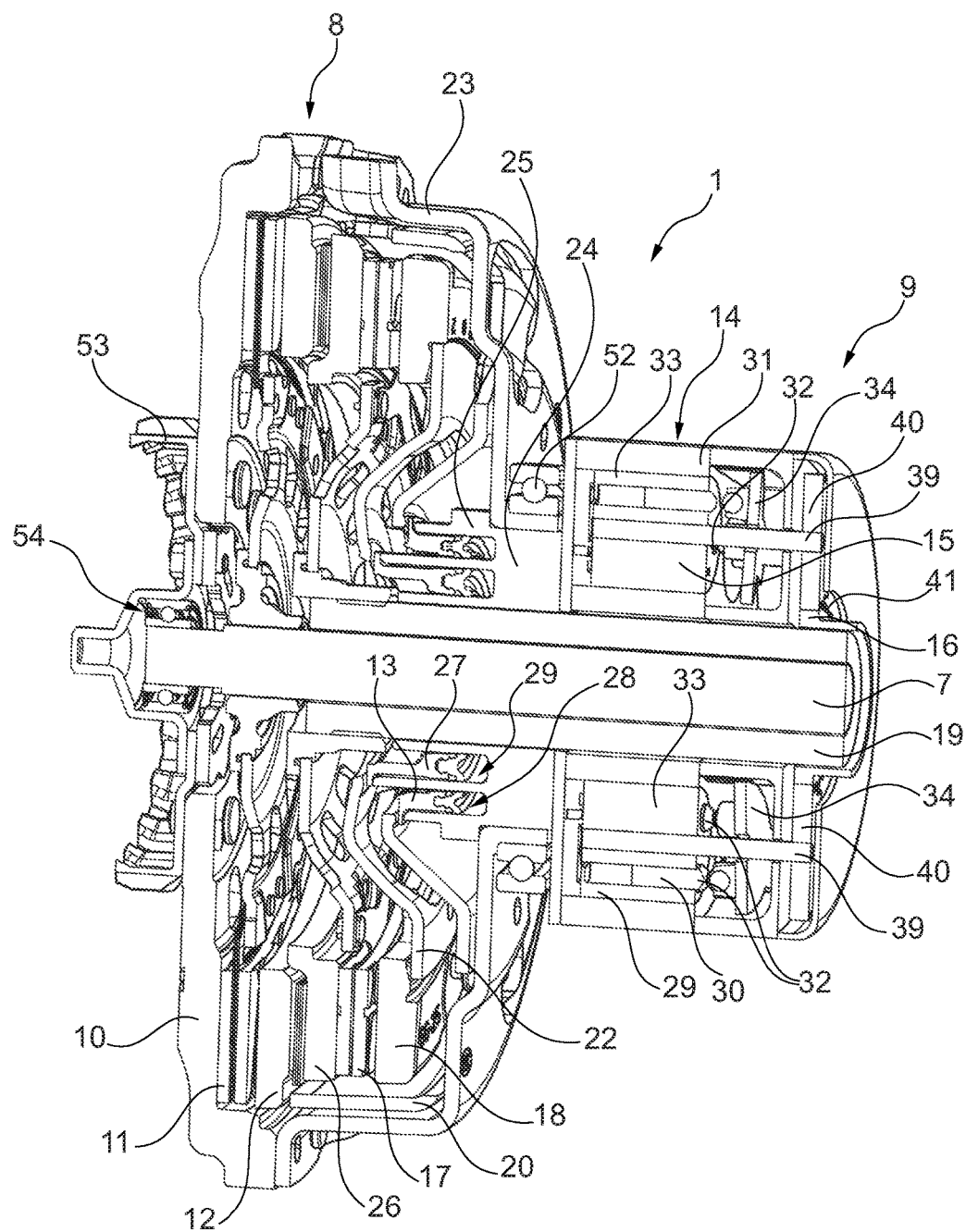
Figure 3:
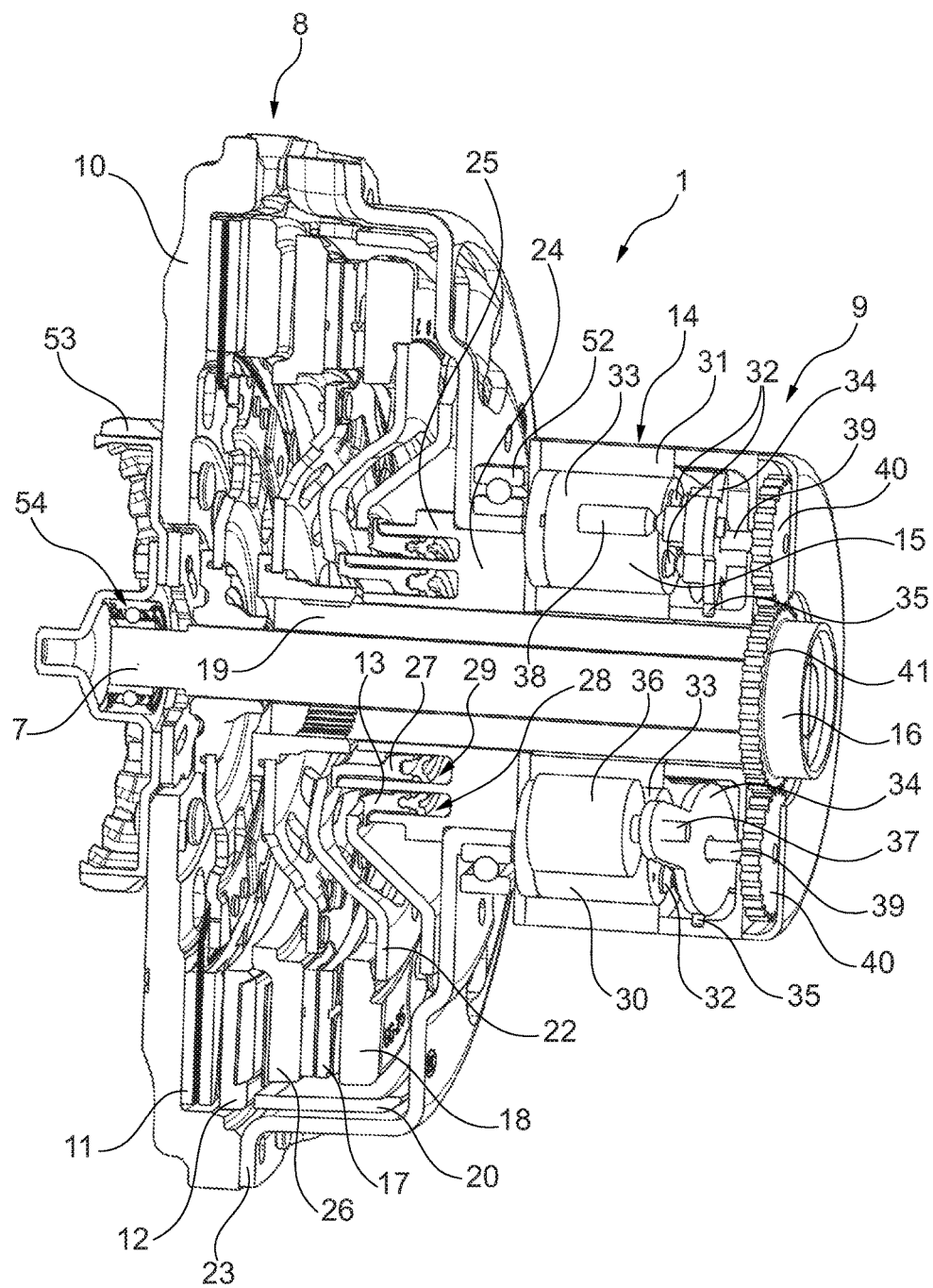

FIGS. 1 to 3 show a first embodiment of the clutch device 1 according to the invention. The clutch device 1 comprises a modular structure, with the components of the clutch 8 (hereinafter also called friction clutch 8) as well as the components of the actuating device 9 being designed in a modular fashion, i.e. integrated inside each other. The friction clutch 8 is here embodied as a double clutch as well as dry-running. Alternatively, the friction clutch 8 can however also be embodied as a wet-running double clutch 8 and/or a single clutch.

In addition to a first clutch part, which essentially comprises the counterpressure plate 10 (hereinafter also called housing lid or first counterpressure plate 10), the clutch disk 11, hereinafter called the first clutch disk 11, as well as the pressure plate 12, hereinafter called first pressure plate 12, the friction clutch 8 also has a second clutch part, which also has a clutch disk, hereinafter called second clutch disk 17, a pressure plate, hereinafter called second pressure plate 18, as well as a counterpressure plate, hereinafter called second counterpressure plate 26. The first clutch disk 11 is connected in a torque-proof fashion to a first transmission input shaft 7 in the operating state of the clutch device 1, the second clutch disk 17 is connected in a torque-proof fashion to a second transmission input shaft 19 in the operating state of the clutch device 1. In order to bring into contact the first clutch disk 11 to the housing lid 10 in a friction-fitting fashion, a first displacement element 20 is provided embodied as a pressure pad. This first displacement element 20 is movable and can be pressed against the first pressure plate 12 such that the first pressure plate 12 is pressed in the coupled position in turn against the first clutch disk 11 and that it is then pressed against the housing lid 10. This way, the first clutch disk 11 as well as the first transmission input shaft 7 connected thereto in a torque-proof fashion can be connected to the housing lid 10 in order to transmit torque. The housing lid 10 in turn is connected torque-proof to the crankshaft 6 of the internal combustion engine 3 during operation/in the operating states.

The second counterpressure plate 26 of the second clutch part is also connected to the housing lid 10 and thus to the crankshaft 6 in a torque-proof fashion. The second pressure plate 18 is here displaceable, together with the second clutch disk 17, in the axial direction in reference to the second counterpressure plate 26. The position of the second pressure plate 18 is again adjustable by a second displacement element 22 embodied as a pressure pad. The second clutch disk 17 is in turn pre-stressed/pressed against the second counterpressure plate 26 in the coupled state of the second clutch part, so that a rotary connection develops of the second counterpressure plate 26 with the second clutch disk 17. The first and second clutch part are furthermore surrounded/encased/covered by a common clutch housing 23, said clutch housing 23 in turn being connected torque-proof to the housing lid 10 and the second counterpressure plate 26. The clutch housing 23 together with the housing lid 10 encase the two clutch parts of the friction clutch 8.

Furthermore, a slave cylinder 24 is connected to the housing lid 10 (torque-proof) at a radial inner ring of the clutch housing 23. This slave cylinder 24 already represents a part of the actuating device 9 and comprises a cylindrical housing 25, in which two actuating pistons 13, 27, hereinafter called first actuating piston 13 and second actuating piston 27, are guided displaceably in the axial direction. The first actuating piston 13 of the slave cylinder 24 acts directly with a section upon the first displacement element 20 and is motionally coupled thereto, the second actuating piston 27 of the slave cylinder 24 with a section directly cooperates with the second displacement element 22, and is motionally coupled thereto. This way, in case of an axial displacement/change of the displacement position of the respective actuating piston 13, 27 inside the housing 25 here also a displacement/change of the position of the respective displacement element 20 and 22 and the pressure plate 12, 18 occurs. The two actuating pistons 13 and 27 are embodied as cylindrical pistons, arranged coaxially in reference to each other (see FIG. 2). Alternatively, the two actuating pistons 13 and 27 may also be embodied as plungers.

The first actuating piston 13 encloses with the housing 25 a first pressure chamber 28, the second actuating piston 27 encloses with the housing 25 a second pressure chamber 29. The first pressure chamber 28 is connected hydraulically to the pump 15, hereinafter called first pump 15. The second pressure chamber 29 of the second actuating piston 27 is hydraulically connected to the second pump 30.

The first and the second pump 15 and 30 are here designed identically, and embodied as adjustable, hydraulic axial piston pumps/swashplate pumps, with their piston stroke being adjustable. The first as well as the second pump 15 and 30 are here arranged along the perimeter of the rotary axis of the clutch, preferably offset by approximately 180° and held in a common pump seat housing 31. The pump seat housing 31 is essentially designed in a hollow-cylindrical fashion and arranged coaxially around the two transmission input shafts 7 and 19. The pump seat housing 31 is connected in a torque-proof fashion to the clutch housing 23 as well as the housing lid 10. In a rotating housing lid 10 therefore the pump seat housing 31 is also driven and rotates including the two pumps 15 and 30 about the axis of rotation of the clutch. By rotating the pump seat housing 31 in reference to the housing part 16 the pumps 15 and 30 are driven.

Figure 7:
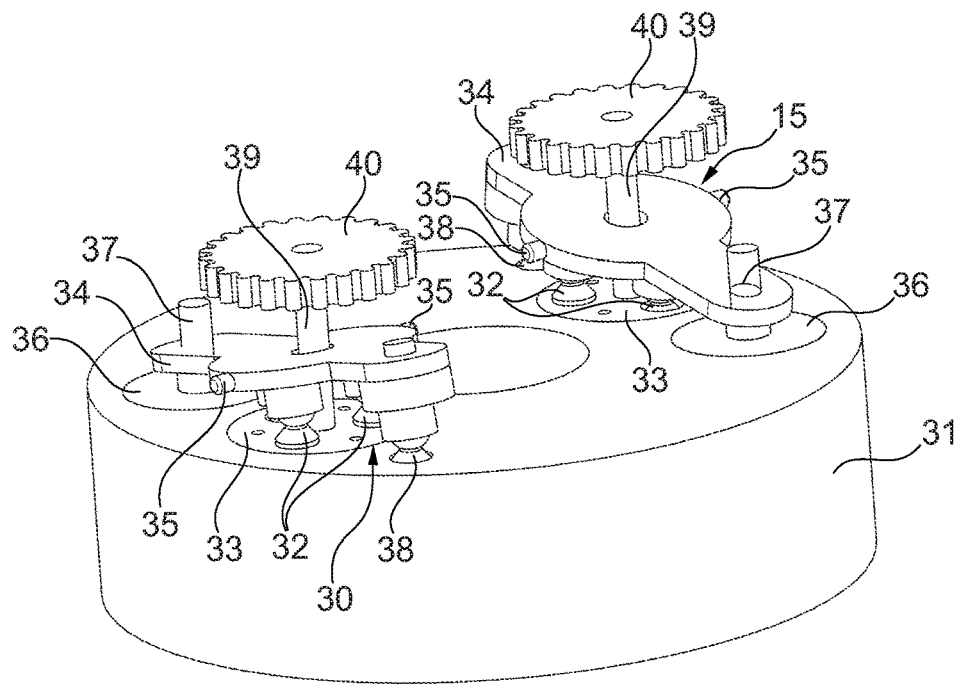

The two pumps 15 and 30, particularly their arrangement in the pump seat housing 31, are shown clearly in FIG. 7. The pumps 15, 30 respectively comprise one or more, here three (alternatively also five or six) pump pistons 32, which are supported displaceable in the axial direction inside a drum 33/pump drum/revolver of the pump 15 or 30. With an end section the respective pump pistons 32 are supported in a swashplate 34 (via slide shoes), adjustable in its tilt, with the pump pistons 32 including the drums 33 being supported rotationally in reference to the swashplate 34. The swashplate 34 per se is aligned diagonally/perpendicular in reference to the axis of rotation of the drum 33 and adjustable in its diagonal position. This way the piston stroke of the pump pistons 32 is also adjustable. The swashplate 35 is further supported rotationally via two sliding knuckles 35, forming a swivel axis. The sliding knuckles 35 are supported inside the pump seat housing 31 such that the swashplate 34 can rotate/tilt about the swivel axis; however the sliding knuckles 35 per se remain fixed in their position in the axial direction.

Figure 5:
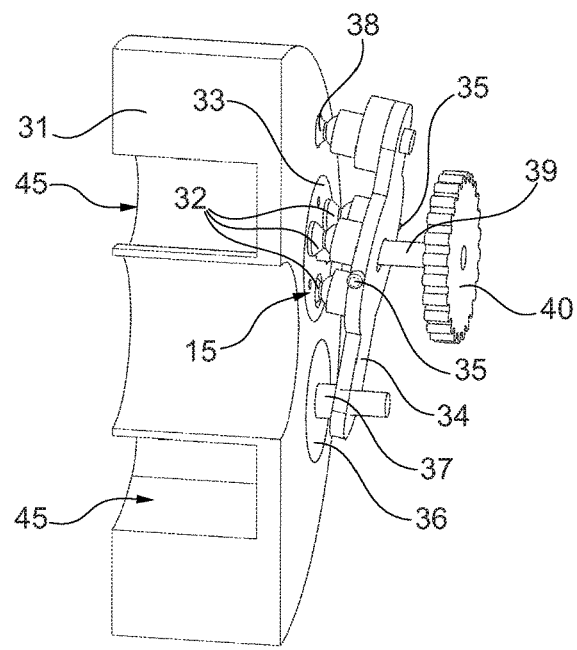
Figure 6:
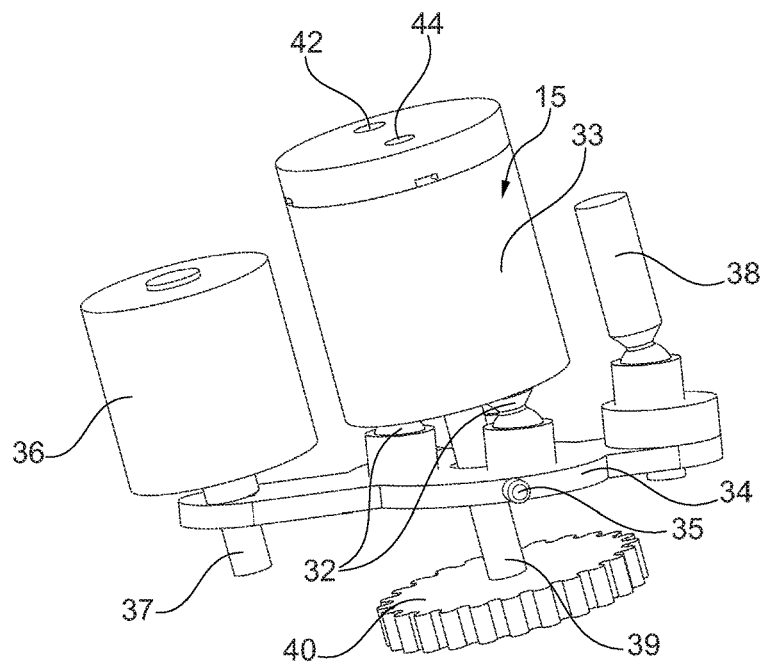

The design of the first pump 15, particularly its swashplate 34, is particularly clearly discernible in FIGS. 5 and 6. The second pump 30 is designed like the pump 15, therefore the features of the first pump 15 explained in greater detail in the following also apply to the second pump 30. An actuator 36 is provided for adjusting the incline of the swashplate 34, which is arranged at a first end section of the swashplate 34. A tappet 37 of the actuator 36 contacts the first end section of the swashplate 34 and is supported in a back-and-forth displaceable fashion parallel in reference to the longitudinal axis of the pump drum 33. At a second end section of the swashplate 37, which second end section is located at a different side of the swivel axis formed by the sliding knuckles 35 than the first end section, a sensor piston 38 is arranged and contacts the swashplate 34. In the following, the sensor piston 38 is also described in greater detail in connection with FIG. 9. Furthermore, a pump drive shaft 39 projects in the axial direction (along the longitudinal axis of the drum 33) from the first pump 15 towards the side of the swashplate 34. This pump drive shaft 39 penetrates the swashplate 34 and is guided through a penetrating hole of the swashplate 34. The pump drive shaft 39 comprises a gear 40 at a side of the swashplate 34, facing away from the drum 33. The gear 40 is embodied as a straight toothed sprocket 40. This sprocket 40 in turn engages a toothed section 41 of the housing part 16, which housing part 16 being embodied essentially like a sheath. The toothed section 41 is embodied as external gears. By rotating the pump seat housing 31 in reference to the housing part 16 the respective sprockets 40, 41 engage each other, ultimately driving the pumps 15, 30. The direction of rotation of the pump drum 33, also called drive direction of the pump, is here also predetermined by the direction of rotation of the gear 40 and thus indirectly by the direction of rotation of the counterpressure plate 10/26.

Figure 4:
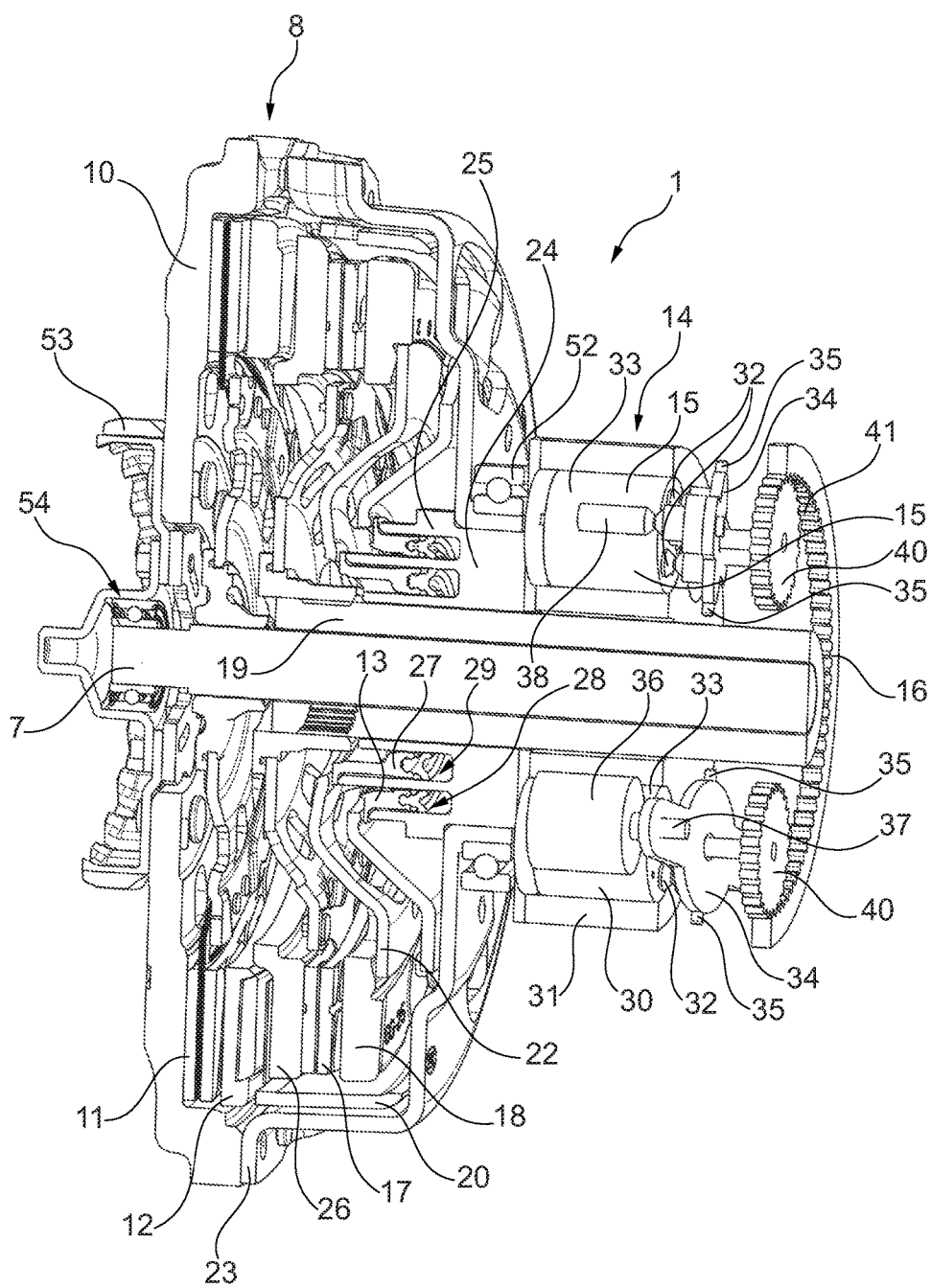

As discernible in FIG. 4 in the context with another embodiment of the clutch device 1 according to the invention, the housing part 16 can also be essentially embodied as an annular sprocket, with its gears 41 being internal gears, and which internal gears in turn being engaged by the sprocket 40. Such internal gears allow a particularly skillful trajectory of the pistons. The remaining design of the actuating device 9 and the friction clutch 8 are embodied equivalent to the first embodiment. Here the pumps are driven by the relative rotation of the pump seat housing 31 including the pumps 15, 30 in reference to the (fixed) housing part 15 during operation of the internal combustion engine 3.

Figure 9:
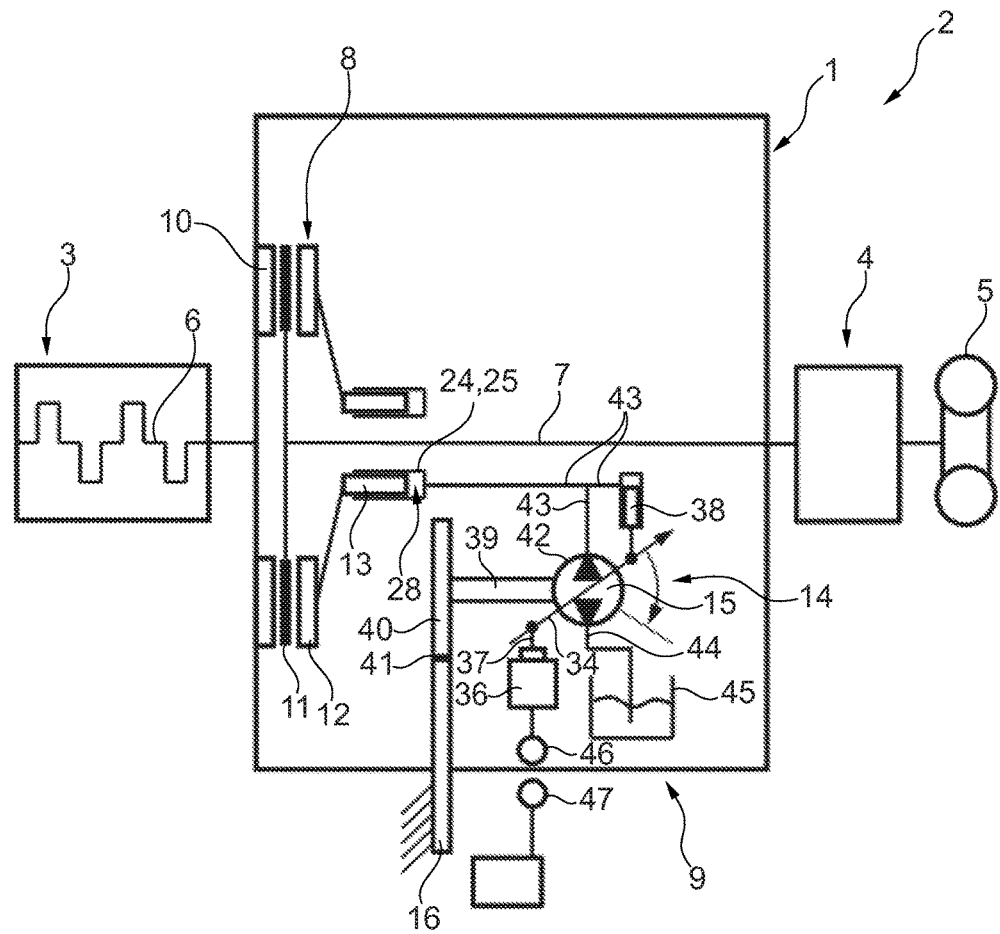

The fluid-guiding connection between the respective pump 15, 30 and the slave cylinder 24 to control the displacement position of the first and the second actuating piston 13 and 27 is clearly discernible in connection with FIG. 9. FIG. 9, having a schematic diagram, illustrates for reasons of clarity only the circuit of the first pump 15 with the first clutch part. The second pump 30, shown above in FIGS. 1 to 3, is however operating and designed for the second clutch part identical to those of the first pump 15.

The first pump 15 comprises a first and a second fluid connection 42, 44. The first fluid connection 42 of the first pump 15 is hydraulically connected to a pressure line 43, which pressure line 43 is further hydraulically connected to the first pressure chamber 28. A second fluid connection 44 of the first pump 15 is hydraulically connected to a fluid storage space 45/reservoir. Each of the two fluid connections 42, 44 is connected to a chamber of the first pump 15, which chambers form suction/or pressure chambers, depending on the setting of the swashplate 34. The fluid reservoir 45 is provided with a volume compensation device in the form of bellows or a gas-filled membrane.

In the first clutch part of the clutch device 1 shown in FIG. 9 the actuating device 9 is embodied such that it represents a clutch normally disengaged. FIG. 9 shows the decoupled state. If the first pressure plate 12 of the first clutch part shall be displaced by the first actuating piston 13 into a coupled position, the swashplate 34 must be pivoted in a first tilting direction (via the actuator 36) such that the pump piston 32 conveys pressure fluid into the pressure line 43 and thus impinges the pressure line 43 with a (first) pressure. During the increase of pressure in the pressure line 43 here a pressure fluid is conveyed from the reservoir 45 into the pressure line 43 such that here a (first) pressure is generated and the first actuating piston 13 is pressed/pre-stressed against the first pressure plate 12.

In order to open the clutch 8 again, the swashplate 34 must be tilted in a second tilting direction, opposite the first tilting direction, such that pressure fluid is conveyed out of the pressure line 43 into the fluid reservoir 45. This way, the pressure is reduced in the pressure line 43 and upon a certain second pressure being reached (second pressure being lower than the first pressure) the first actuating piston 13 is moved away from the first pressure plate 12. This way the first clutch part is opened. If the (first) pressure in the pressure line 43 is kept essentially even/constant, the swashplate 34 must be kept essentially in a horizontal position, i.e. aligned essentially perpendicular in reference to the axis of rotation of the drum 33 so that the fluid volume contained inside the pressure line 43 remains constant and the first actuating piston 13 remains pressed against the first displacement element 20 with an even pre-stressing force.

As further discernible from FIG. 9, the sensor piston 38/sensing piston is connected hydraulically to the pressure line 43, with the piston being supported at the second end section of the swivel-like supported swashplate 34. Due to the fact that the respective pump 15, 30 is embodied as an adjustable pump, its direction of conveyance can be reversed and the fluid pressure influencing the displacement position of the actuating piston 13, 27 can be controlled depending on the pump setting. The pump setting influencing the direction of conveyance of at least one pump 15, 30 can be changed by the actuator 36. The sensor piston 38 is here embodied and connected to the pressure line 43 such that, when after an appropriate motion of the tappet 37 (by a change of the exciting force) of the actuator 36 the pressure increases in the pressure line 43, the sensor piston 38 deploys due to the increased pressure (first pump position). At a certain (first) pressure in the pressure line 43, accordingly a horizontal readjustment (back into the neutral position/into the zero position) of the swashplate 34 occurs by the sensor piston 38. If after another appropriate motion of the tappet 37 (by a change of the exciting force) of the actuator 36 the pressure in the pressure line 43 is reduced (in a second pump position), the sensor piston 38 retracts due to the pressure changing in the pressure line 43 so that in case of a certain (first) pressure in the pressure line 43 again a horizontal readjustment (neutral position/into the zero position) of the swashplate 34 occurs by the sensor piston 38. This way a pressure control is implemented and the respective actuating pistons 13, 27 are accordingly adjustable. The neutral position of the swashplate 34 is preferably supported by a return spring, with the return spring impacting a swashplate 34 such that the swashplate 34 being supported with a certain spring force in the neutral position. The pumps 25, 30 are therefore (in the two pump settings) each adjustable through zero, with the pump setting adjusting the direction of conveyance/conveyance stroke being adjustable by the position/setting/incline of the swashplate 34.

The sensor piston 38 is here connected via a branching/side channel to the pressure line 43. In this branching, preferably a throttle is provided/integrated between the pressure line 43 and the sensor piston 38, which serves as a damper element for the pressure fluctuations generated during operation by the pump piston 32.

The actuator 36 is preferably embodied as an electromotive actuator, which can be driven via an inductive coil system. For this purpose, a receiver coil 46 is provided inside the pump seat housing 31 as well as a transmitter coil 47 outside the pump seat housing 31. The transmitter coil 47 drives via an inductive field the receiver coil 46.

Figure 8:
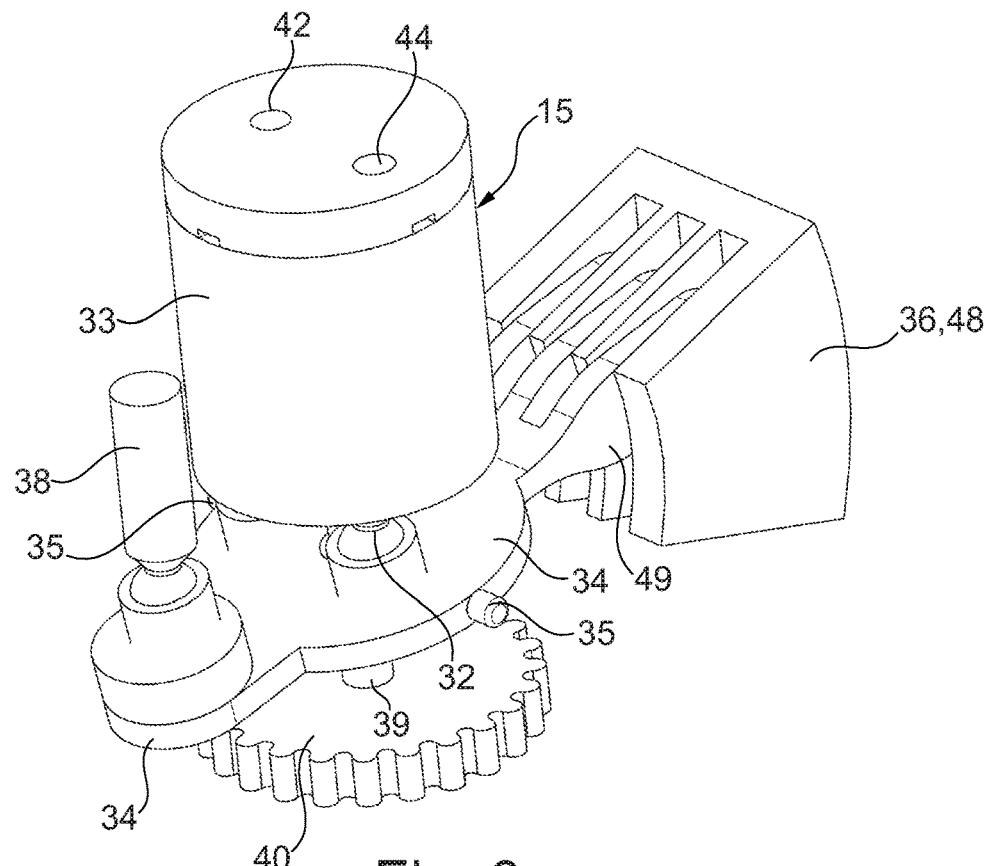

In the context with FIG. 8 another exemplary embodiment is shown and illustrates an alternative embodiment of the actuator 36 via a voice coil, similar to the drive of hard drive arms. The drive comprises a stationary part 48 and a moving part 49, with the moving part 49 in turn being embodied integral with the swashplate 34. Depending on the embodiment, at least one of the two parts is a coil set, the other one then represents one or more magnets or also a coil set.

Furthermore it is possible, as shown in connection with FIG. 10, to directly provide/fasten the receiver coil 46 at the first end section of the swashplate 34 in order to move the swashplate 34 directly via an inductive force.

As discernible in connection with FIG. 11, the two (first and second) pumps 15 and 30, particularly their drums 33, can be embodied differently according to another embodiment. In this embodiment the drums 33 of the first and second pumps 15 and 30 are coaxial, arranged outside from one another, instead of being offset along the perimeters, as shown in the previous embodiments.

Furthermore it is also possible to arrange the sliding knuckles 35 of the swashplate 34 such that the pivotal axis of the swashplate 34 is arranged eccentrically in reference to the drum 33 and its longitudinal axis, as discernible in connection with FIG. 12. The longitudinal axis of the drum 33 and the pivotal axis of the swashplate pass each other at a distance and abstain from intersecting.

Figure 13:
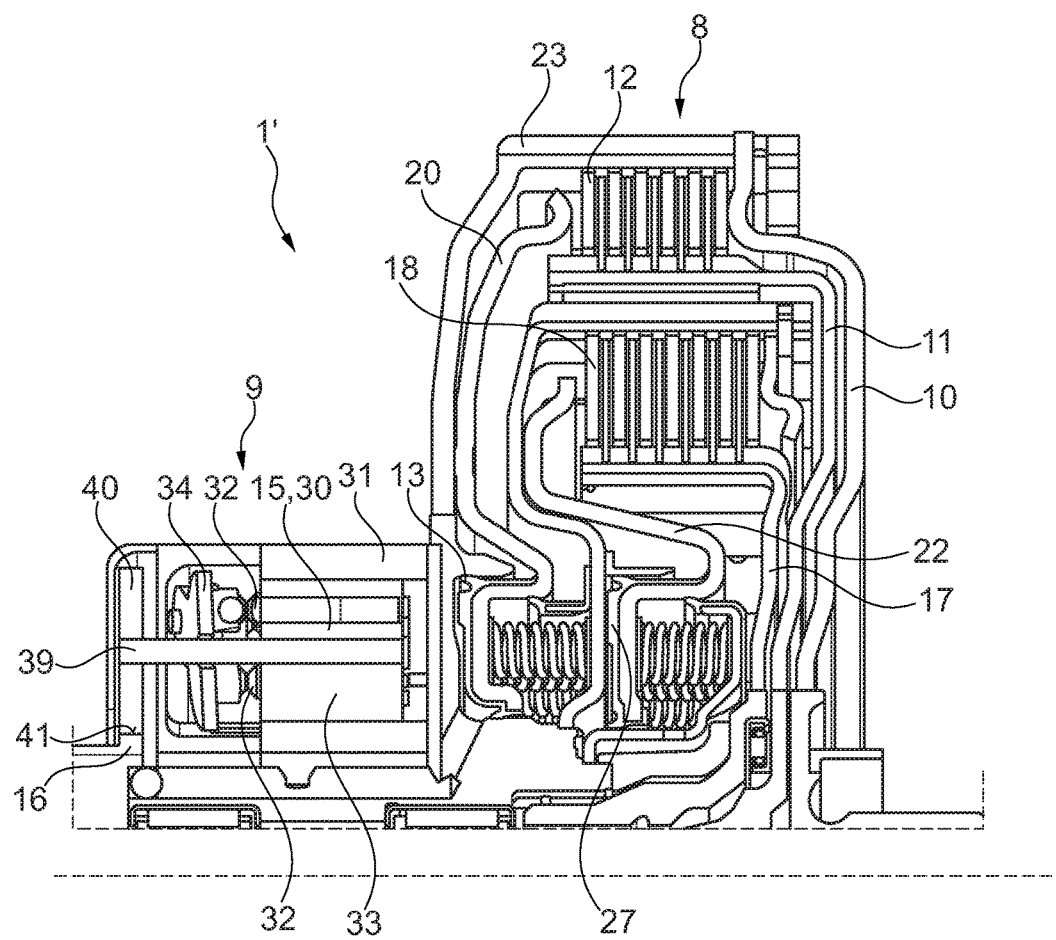

Additionally, it is possible to embody the friction clutch 6 as a multi-disk clutch as well, as shown in FIG. 13. The respective clutch disks 11, 17 are then each embodied as a type of disk carrier, comprising several plate-shaped clutch disks. The counterpressure plates 10, 26 in turn can be embodied as external carriers and preferably also show several disks, which cooperate with a pressure plate 12, 18 and can be connected thereto in a friction-fitting fashion. In order to operate each of the two clutch parts, again the actuating pistons 13, 27 and the displacement elements 20, 22 are provided.

The control electronic for this actuator 36 is fixed at the housing and via the control of the actuator it determines the relative position of the inclined plane.

Furthermore it is also possible to provide a compensation piston to compensate centrifugal forces, which is arranged along the circumference of the clutch 8 opposite in reference to the pump 15, 30. A connection of the pump would then be given at the piston, the other one at the compensation piston and at the reservoir 45.

In other words, by the clutch device 1 according to the invention a fully-integrated module is implemented comprising a clutch 8, actuator/operating device 9, and perhaps cooling. Here, one or two adjustment pumps (first and/or second pump 15, 30) are installed for actuating in the clutch 8/the clutch device 1, depending on the embodiment as an individual clutch or a double clutch. Installed in the clutch device 1 are: the pump 15/20 as a transmitter, an annular piston (actuating piston 13/27) and/or several plungers (actuating pistons 13/27) as receiver, a reservoir (fluid storage space 45), and an element for controlling the adjustment pump 15/30.

The pump 15, 30 is therefore integrated in the clutch module 1 together with the slave cylinder 24 and the reservoir 45. The module 1 may be embodied as a double clutch with two pumps 15, 30. The pump 15, 30 may be embodied as an adjustment pump. The adjustment device is respectively addressed via one control actuator 36. The adjustment device may be embodied with or without load return. The adjustment pumps 15, 30 may be realized in different displacement principles. Named as possible examples are here axial and radial piston machines as well as vane motors.

The pump 15, 30 is driven by the rotation of the clutch 8 (relative motion of the clutch in reference to the transmission housing/housing). The support of the pump drive occurs normally via the non-rotating elements, which are connected torque-proof to the housing parts. In case of a hybrid drive it is necessary, though, to allow driving the pumps also when the internal combustion engine is not operating. This is possible when the support of the pump drive is coupled to the E-machine of the drive. The clutch 8 is preferably operated directly, normally open/normally disengaged. Other embodiments of the clutch (lever operated, normally closed, . . . ) are generally possible as well. Furthermore, a combination of the rotating actuator 36 is possible both with a so-called dry-clutch system as well as a so-called wet-clutch system. Both pumps 15, 30 are located on the almost identical diameter of the pump seat housing 31 with their outlets/first fluid connections 42 on the diameter of the respective actuating piston 13, 27 of the slave cylinder 24 in order to reduce the influences of centrifugal forces upon the pressurized fluid.

Alternatively, the reservoir 45 can be connected to the compensation piston, in order to this way reduce the influence of centrifugal forces. Here, the pumps 15, 30 no longer need to rest on the same radius as the slave piston/actuator pistons 13, 27. The determination of the pressure at the displacement pistons is beneficially performed as a determination of the pressure difference using pressure difference—sensor pistons between the reservoir 45 and the pressure chamber. This way, the effects of the centrifugal forces are not acting, which result from the hydrostatic pressure in the reservoir 45. The control force may be generated inside or outside the module 1. It is particularly advantageous to generate the control force with electromagnetic transmitters, which are located in the clutch module 1. The current required is transmitted wirelessly via coils into the clutch device 1.

As an alternative to the direct transmission of the signals via the airgap, the actuating energy can also be generated from the motor rotation in a generator. Here the control occurs via the exciter current in the stator of the generator transmitter. Here, the rotation of the clutch 8 must be considered during the control process.

The (difference) pressure sensors, together with the centrifugal force, result in a pressure control with P-characteristics. Overall, here a pressure control of the clutch 8 results via the control force/the control signal.

In order to prevent a closed clutch 8 after an unexpected motor stop, a defined, small blind (mini-blind) may be installed from the pressure chamber to the reservoir 45.

FIG. 1 shows the rotating part of the H-clutch module/the clutch device 1 as well as the stationary gears 41, which are fastened at the housing/transmission housing and/or the clutch bell. The module 1 can be roughly divided into a clutch area and a hydraulic part/actuating part. The interfaces of the module 1 are the spline to the two-weight flywheel and/or motor, the bearing 52 by which the clutch 8 is supported at the housing, the two transmission input shafts 7, 19, and the stationary gears 41, as well as the energy transmission. The transmission of energy is not shown, here. It seems beneficial, since only a control power and not the actuating energy needs to be transmitted, to transmit the control power via a touchless technology using coils.

FIG. 2 shows a cross-section through the module 1. The design is here explained from the left to the right. The clutch 8 is connected via the spline 53 to the two-weight flywheel. A pilot bearing 54 is located at the end of the transmission input shaft 1. Both clutch parts/partial clutches are directly operated and thus normally open. The pressure plates 12, 18 of the two partial clutches are connected via pressure pads 20, 22 to their respective master piston/actuator piston 13, 27 of the CSC (Central Clutch Cylinder)/slave cylinder 24. The CSC 24 is similar to a normal, stationary CSC 24. Here, no bearing is located between the annular piston 13, 27 of the CSC 24 and the pressure pads 20, 22, because the CSC 24 rotates as well. This reduces the drag torque. The primary bearing 52 is located between the clutch 8/clutch area and the hydraulic/pump seat housing 31, because this position is near the center of gravity. Unlike in clutches 8 operated from the outside, this bearing 54 is not subject to axial forces. The diameter of the stationary bearing ring can be enlarged in order to allow plugging on the entire module 1.

The pumps 15, 30 to actuate the partial clutches are provided in a common housing, the pump seat housing 31. Each partial clutch has its own pump 15, 30. The pumps 15, 30 are here embodied as adjustable piston pumps with a revolver 33 and a piston 32. The transmission of the pump 15, 30 is here changed via a swashplate 34, and the effective direction is inverted as well. The pumps 15, 30 are each connected to a reservoir 45 and a CSC 24. This way the fluid can by pumped back and forth between the CSC 24 and the reservoir 45. The drive of the pump revolver 33 occurs via a sprocket 40 at the pump shaft/pump drive shaft 39, which engages a fixed sprocket 40.

FIG. 3 shows the same view as FIG. 2, with here some parts of the pump arrangement being removed from the cross-section. In the upper pump 15, 30 the sensor piston 38 is discernible, which is impinged with the clutch pressure and this way engages the incline of the swashplate 34 in a controlling fashion. In the lower pump 15, 30 the actuator 36 is displayed, with its control force adjusting the pump pressure and thus the clutch torque.

FIG. 4 shows as an alternative the same arrangement with an internal gear at the housing/housing part 16. By the embodiment as an internal gear the travel path of the piston 32 changes such that the resulting movement is exposed to less centrifugal force. As another potential embodiment, here the coupling via a belt drive is also possible.

FIG. 5 shows the pump unit of a partial clutch in a cross-section. Here, both partial clutches may show a common or separate reservoirs 45. The reservoir 45 shall be equipped in any case with a measure for pressure compensation, which changes the volume contained therein upon actuation. Potential devices used here are e.g., bellows, gas volumes (optionally separated via a membrane).

The piston pump 15, 30 shown here comprises three cylinders/pump cylinders and pump pistons 32. In practice, an embodiment with more cylinders (five or six) is probably more beneficial, because here both pressure fluctuations as well as the variation of the tipping moment upon the swashplate (60) are reduced. Here, sensor pistons 38 and control actuators 36 are embodied on opposite sides/end sections of the swashplate 34. This facilitates the compensation of the swashplate 34 with regards to axial excitation and centrifugal forces.

The swashplate 34 is supported pivotally in the center (slide bearing knuckle 35). This position minimizes the vibrations of the tilting moment generated by the piston 32.

FIG. 6 shows a pump module without a housing 31. The actuator 36 is here similar to the magnetic coils of conventional valves.

FIG. 7 shows the position of both pumps 15, 30 in reference to each other. In order to keep the entire unit in a balanced state, the pump reservoir 33, control cylinder, actuator 36, and reservoir 45 of the double clutch are arranged symmetrically about the transmission shaft 7, 19. Here, the pumps 15, 30 are rotated in a slightly different way so that the outlet of each pump 15, 30 is located on the central radius of the corresponding CSC 24.

FIG. 8 shows an alternative actuator via voice coil, similar to the drive of hard drive arms. The drive comprises a stationary part 48 and a moving part 49. Depending on the embodiment, at least one of the two parts represents a coil set, the other one then one or more magnets or also a coil set.

FIG. 9 shows a schematic diagram using an individual clutch as the example. The drivetrain 2 comprises a motor/internal combustion engine 3, clutch device 1, transmission 4, and wheel 5. The energy is transmitted from the motor 3 via the crankshaft 6 into the clutch 8. Here, the connection between the disk/clutch disk 11 and the pressure plate 12 and the central plate/counterpressure plate 10 can be closed in order to connect the motor 3 to the transmission 4. The pressure plate 12 is actuated by an annular piston 13 via a pressure pad 20. The pressure upon the piston 13 is provided by an adjustment pump 15, able to invert the direction. The adjustment pump 15 is driven by sprockets 40 engaging a fixed gear 41. The transmission of the adjustment pump 15 is controlled via a sensor piston 38, which is impinged with the clutch pressure and a control actuator 36. The control actuator 36 obtains its power via a wireless coil connection (46, 47) from a control device. A damper may be installed in the supply line of the control piston 38.

FIG. 10 shows the option without an actuator at the clutch providing the control force directly from the outside upon the swashplate 34.

The force is transmitted from the transmission coil 47 to a receiver coil 46 or a magnet. Depending on the arrangement, the receiver moves here axially or radially (axially: shows the advantage that any rotary imbalances are irrelevant; radially: here the force can be transmitted via the eddy brake or by the generator. This shows the advantage of even lower energy consumption. However, the control expense is greater, because here the speed must be considered.)

Due to the fact that the pumps 15, 30 obtain their energy from the drivetrain 2, the clutch 8 can be closed in the configuration shown here only when it is rotating as well. This can be overcome via freewheels, each of which utilizing the greater difference between the clutch 8 and the housing 16 or the clutch 8 and the electric motor in order to operate the pump 15.

FIG. 11 shows an alternative embodiment of the piston pump 15. Here, the pistons travel directly in the pump housing about the shaft. The pump housing/pump seat housing 31 serves therefore simultaneously as the revolver 33 of both pumps 15, 30. The pumps 15, 30 are radially stacked such that the pistons 32 are located on the same radius as the corresponding CSC 24.

FIG. 12 shows a potential arrangement of the swashplate 34. In this case the tipping point of the swashplate 34 is eccentric. Accordingly, the force otherwise generated by the sensor piston 38 results here from the normal pistons 32. Here, only the control actuator 36 is required. In this arrangement the slightly greater fluctuation of the tipping moment upon the swashplate 34 is disadvantageous.

FIG. 13 shows an embodiment as a wet double clutch. The clutch 8 is radially stacked in this example. In the embodiment with a wet double clutch no closed reservoir 45 is required, but the pumps 15, 30 can be connected to the cooling oil circuit. Preferably then the reservoir 45 can be completely waived or the reservoir 45 can be open inwardly in the radial direction.

LIST OF REFERENCE CHARACTERS 1, 1' Clutch device
2 Drive train
3 Internal combustion engine
4 Transmission
5 Wheel
6 Crankshaft
7 Transmission input shaft/first transmission input shaft
8 Clutch/Friction clutch
9 Actuator device
10 First counterpressure plate/housing lid
11 Clutch disk/first clutch disk
12 Pressure plate/first pressure plate
13 Actuator piston/first actuator piston
14 Drive unit
15 First pump
16 Housing part
17 Second clutch disk
18 Second pressure plate
19 Second transmission input shaft
20 First displacement element
22 Second displacement element
23 Clutch housing
24 Slave cylinder
25 Housing
26 Second counterpressure plate
27 Second actuator piston
28 First pressure chamber
29 Second pressure chamber
30 Second pump
31 Pump seat housing
32 Pump piston
33 Drum
34 Swashplate
35 Sliding knuckle
36 Actuator
37 Tappet
38 Sensor piston
39 Pump drive shaft
40 Sprocket
41 Gears
42 First fluid connection
43 Pressure line
44 Second fluid connection
45 Fluid reservoir
46 Receiver coil
47 Transmitter coil
48 Stationary part
49 Moving part
52 Bearing
53 Spline
54 Pilot bearing

The invention claimed is:

1. A clutch device for a drivetrain of a motor vehicle comprising a pressure plate that is displaceable in an axial direction of the clutch device, a clutch disk, and a counterpressure plate, the pressure plate in a coupled position pressing a clutch disk against the counterpressure plate that is connectable to a crankshaft of an internal combustion engine, an actuator device having a displaceable actuator piston, with a displacement position of the actuator piston determining a position of the pressure plate, the actuator piston for displacing the pressure plate allowing the actuator device to be driven between the coupled position and a decoupled position by a drive unit, the drive unit comprises two pumps, with the pumps being received in a pump seat housing and the pump seat housing being connected in a torque-proof fashion to the counterpressure plate, the two pumps being circumferentially spaced apart from each other.

2. The clutch device according to claim 1, wherein the pumps are driven by a relative motion in reference to a housing component, which is connected to the pump seat housing in a first operating state.

3. The clutch device according to claim 2, wherein the housing component in a second operating state is driven by another, second drive unit.

4. The clutch device according to claim 1, wherein at least one first pump of the two pumps comprises two fluid connections, with a first fluid connection being connected to a slave cylinder receiving the actuator piston and a second fluid connection being connected to a fluid reservoir.

5. The clutch device according to claim 1, wherein at least one first pump of the two pumps is embodied as an adjustable pump, with a direction of conveyance being invertible independent from a drive direction of the adjustable pump and with a conveyance volume thereof being adjustable through zero, allowing a fluid pressure influencing a displacement position of the actuator piston to be controlled depending on a pump setting.

6. The clutch device according to claim 1, wherein the pump seat housing is arranged coaxially in reference to a transmission input shaft of a transmission, connected in a torque-proof fashion to the clutch disk in an operating state of the clutch device.

7. The clutch device according to claim 1, wherein the pump seat housing is arranged in the axial direction next to a clutch housing, the clutch housing being connected torque-proof to the counterpressure plate and the clutch housing encasing the pressure plate and the clutch disk, with the clutch housing connecting the counterpressure plate torque-proof to the pump seat housing.

8. A clutch device for a drivetrain of a motor vehicle comprising a pressure plate that is displaceable in an axial direction of the clutch device, a clutch disk, and a counterpressure plate, the pressure plate in a coupled position pressing a clutch disk against the counterpressure plate that is connectable to a crankshaft of an internal combustion engine, an actuator device having a displaceable actuator piston, with a displacement position of the actuator piston determining a position of the pressure plate, the actuator piston for displacing the pressure plate allowing the actuator device to be driven between the coupled position and a decoupled position by a drive unit, the drive unit comprises at least one pump, with the at least one pump being received in a pump seat housing and the pump seat housing being connected in a torque-proof fashion to the counterpressure plate, wherein the at least one pump is embodied as an adjustable pump, with a direction of conveyance being invertible independent from a drive direction of the pump and with a conveyance volume thereof being adjustable through zero, allowing a fluid pressure influencing a displacement position of the actuator piston to be controlled depending on a pump setting, wherein the direction of conveyance and the volume conveyed of at least one of the pump settings influencing the pump is changeable by an actuator.

9. The clutch device according to claim 8, wherein the at least one pump has a pressure control, which resets the at least one pump into a neutral position when a certain fluid pressure has been reached, predetermined by a control signal at the actuator and applied at the actuator piston and a sensor piston, in said neutral position the fluid pressure is kept constant.

10. The clutch device according to claim 8, wherein the actuator is electromagnetically actuated.

* * * * *